US005150133A

United States Patent [19]

Ohigashi

[11] Patent Number: 5,150,133

[45] Date of Patent: Sep. 22, 1992

[54] ELECTROSTATIC LATENT IMAGE FORMING APPARATUS

[75] Inventor: Chiaki Ohigashi, Yokohama, Japan

[73] Assignee: Matsushita Graphic Communication Systems, Inc., Tokyo, Japan

[21] Appl. No.: 540,942

[22] Filed: Jun. 20, 1990

[30] Foreign Application Priority Data

Jun. 28, 1989 [JP] Japan ................................ 1-165934

[51] Int. Cl.[5] ............................................ G01D 15/06

[52] U.S. Cl. .................................... 346/155; 346/154

[58] Field of Search ................................ 346/155, 154

[56] References Cited

U.S. PATENT DOCUMENTS 3,626,422 12/1971 Lloyd .
4,366,491 12/1982 Ohnishi et al. ...................... 346/155
4,459,603 7/1984 Kimoto .............................. 346/155
4,476,473 10/1984 Wako ................................ 346/155
4,524,370 6/1985 Nishioka et al. .................... 346/155
4,727,386 2/1988 Playe .

FOREIGN PATENT DOCUMENTS 58-14774 1/1983 Japan .
60-68970 4/1985 Japan .

*Primary Examiner*—George H. Miller, Jr.
*Attorney, Agent, or Firm*—Stevens, Davis, Miller & Mosher

[57] ABSTRACT

An electrostatic latent image forming apparatus is used in a printer which prints an image via toner deposition after an electrostatic latent image forming step. A conductive member divided into separate segments is provided at a position on a side of a sheet of electrostatic recording paper opposite to the side of the recording paper on which a recording head is positioned, in opposed relationship to the control electrodes of the recording head to improve images obtained on high resistance electrostatic recording paper and in low humidity conditions.

15 Claims, 5 Drawing Sheets

ELECTROSTATIC LATENT IMAGE FORMING APPARATUS

BACKGROUND OF THE INVENTION

The present invention relates to an electrostatic latent image forming apparatus of the uniplane control type which is capable of forming, by applying voltage pulses of opposite polarities to styluses and control electrodes which are arranged closely to one another in one plane, an electrostatic latent image on an electrostatic latent image recording medium formed by a dielectric layer or by a combination of a dielectric layer and at least one conductive layer, which medium is in contact with the styluses and the control electrodes.

FIG. 6 is a schematic sectional view of a conventional example of such uniplane control type electrostatic latent image forming apparatus, and FIG. 7 is an electric equivalent circuit diagram thereof.

In FIG. 6, reference numeral 11 denotes an electrostatic recording paper as an electrostatic latent image recording medium, which is formed by four layers including a surface electrostatic layer 1, an intermediate conductive layer 2, a paper base 3 and a back resistance layer (conductive layer) 4. Reference numeral 8 denotes a stylus, and numerals *7a* and *7b* denote control electrodes. Reference numeral 9 denotes a stylus drive circuit for applying to the stylus 8 a recording voltage pulse having a negative polarity, and numeral 10 denotes a control electrode drive circuit for applying to the control electrodes *7a* and *7b* a recording voltage pulse having a positive polarity. Reference numeral 6 denotes a pad roller used for pressing the electrostatic recording paper 11 against the stylus 8 and the control electrodes *7a* and *7b*, which pad roller is made of an insulating material (such as polyurethane foam).

The operation, function of each constituent, and characteristics of the conventional electrostatic latent image forming apparatus having the above construction will be described below with reference to FIG. 7.

In this electrostatic latent image forming apparatus, on the occasion of forming (recording) an electrostatic latent image, the stylus drive circuit 9 acts to apply a recording voltage pulse of a negative polarity to the stylus 8 and, at the same time, the control electrode drive circuit 10 acts to apply a recording voltage pulse of a positive polarity to the control the electrodes *7a* and *7b*.

Application of the positive polarity voltage to the control electrodes *7a* and *7b* raises electric potentials of the intermediate conductive layer 2, the paper base 3 and the back resistance layer 4 at positions thereof located directly below the control electrodes *7a* and *7b* due to capacitive coupling dependent on an electrostatic capacitance Cc possessed by the dielectric layer 1. The potentials of the intermediate conductive layer 2, the paper base 3 and the back resistance layer 4 are transferred to positions of the respective layers directly below the stylus 8 due to the existence of their respective resistivities Rc, Rp and Rb, and are then made to appear on the surface of the dielectric layer 1 owing to an electrostatic capacitance Cp possessed by the dielectric layer 1 at a position thereof directly below the stylus 8. In consequence, the difference in potential between the stylus 8 and the dielectric layer 1 at the position directly below the stylus 8 exceeds a predetermined value, so that discharge is caused to take place between the stylus 8 and the dielectric layer 1. Then, negative charge is transferred from the stylus 8 to the dielectric layer 1 and stored in the latter, thereby forming an electrostatic latent image on the electrostatic recording paper 11.

Each of the layers of the electrostatic recording paper 11 has the following function or service.

First, the surface dielectric layer 1 is made of a mixture of insulating thermoplastic resin and insulating pigment so that it serves as a charge carrier for holding charged particles for a long time and it serves to form a discharge gap of about 10 μm between the stylus 8 and the control electrodes *7a* and *7b* with the aid of an insulating pigment having a diameter of about 3 to 6 μm.

The function of the intermediate conductive layer 2 is to effectively concentrate the positive voltage applied to the control electrodes *7a* and *7b* in the dielectric layer 1 at a position thereof located directly below the stylus 8. This layer also serves as a liquid barrier so that, in coating the dielectric layer 1 on the paper base 3, the resin and the pigment are prevented from immersing into cavities in the paper base 3 to assure the coating with a uniform thickness.

The paper base 3 serves as a part for constituting a base on which the intermediate layer 2 and the dielectric layer 1 are formed and, at the same time, it usually contains water existing in equilibrium with the ambient humidity so as to perform the same function as the intermediate conductive layer 2.

Finally, the back resistance layer 4 does not directly take part in the formation of the electrostatic latent image like the intermediate layer 2, except that it serves to raise the potential at a position directly below the stylus 8. However, it contributes to prevention of any fog caused by the bias due to the rise in potentials of the intermediate layer 2 and the paper base 3 in forming the electrostatic latent image.

However, the above construction has suffered a problem that the formation of an electrostatic latent image cannot be performed stably at high or low humidities.

This is because the resistance values of the intermediate conductive layer, the paper base and the back resistance layer of the electrostatic recording paper vary in accordance with the humidity.

In other words, at high humidities, the resistance values of these layers are lowered to increase leakage occurring through the back resistance layer, so that the potential of the intermediate conductive layer at a position thereof directly below the stylus cannot increase readily, with the result that no sufficient discharge takes place. Further, in case a matrix is constituted by a plurality of styluses and control electrodes, there is caused a ghost image.

To the contrary, at low humidities, an increase in the resistance value hinders the potential of the intermediate conductive layer from rising at a position thereof directly below the stylus, resulting in an sufficient discharge.

To cope with the above problems, it has even been considered to form the intermediate conductive layer and the back resistance layer of the electrostatic recording paper of an electronic conductive material so as to be hardly affected by the humidity (water content). However, this gives rise to another problem that the cost of the electrostatic recording paper is increased.

SUMMARY OF THE INVENTION

In view of the above-described problems, an object of the present invention is to provide a uniplane control type electrostatic latent image forming apparatus which is capable of forming stably an electrostatic latent image without being affected by humidity even with use of conventional electrostatic recording paper.

To solve the above problems, in the uniplane control type latent image forming apparatus according to the present invention, a conductive member is provided to be brought into pressure contact with a portion of an electrostatic latent image recording medium at the back surface thereof which portion is opposed to styluses and control electrodes.

With the construction described above, according to the present invention, the resistance of the conductive member is connected in parallel to the resistance of the electrostatic latent image recording medium itself so that an apparent resistance value of the electrostatic latent image recording medium in areas between the stylus and the control electrodes is reduced and varies less due to humidity, with the result that the potential at a position directly below the stylus can rise sufficiently even at a high or low humidity, thereby making it possible to stably form an electrostatic latent image.

BRIEF DESCRIPTION OF THE DRAWINGS

FIGS. 3 to 5 show a second embodiment of the present invention, wherein

FIG. 3 is a schematic perspective view of the electrostatic latent image forming apparatus, FIG. 4 is a detailed structural view of a multistylus electrostatic recording head, and FIG. 5 is an electric equivalent circuit diagram.

DESCRIPTION OF THE PREFERRED EMBODIMENTS

Figure 1:
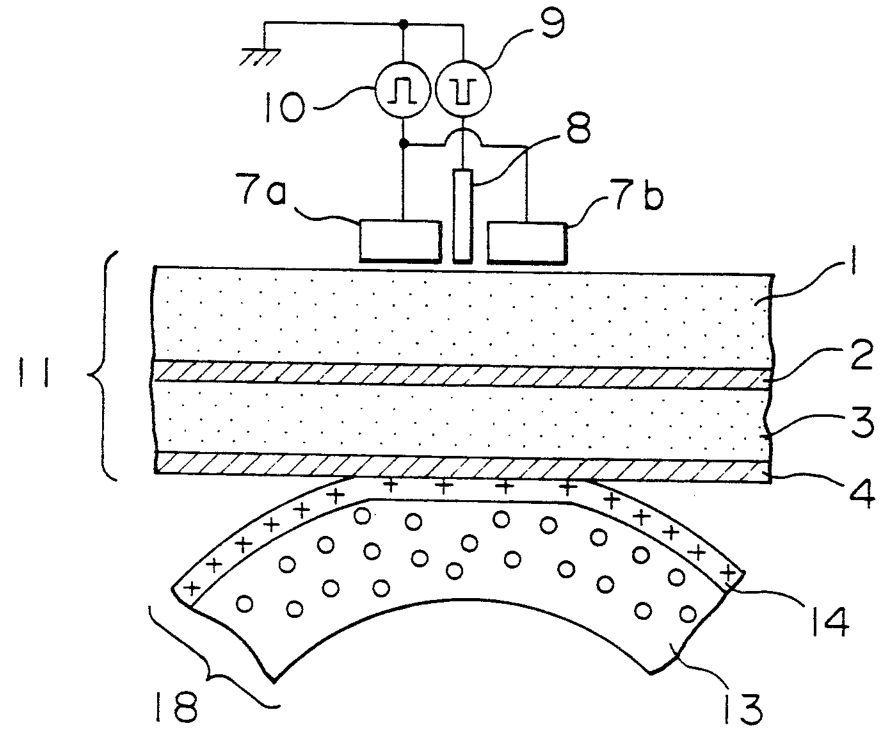
FIGS. 1 and 2 are a schematic sectional view and an electric equivalent circuit diagram of an electrostatic latent image forming apparatus in accordance with a first embodiment of the present invention, respectively.
Figure 2:
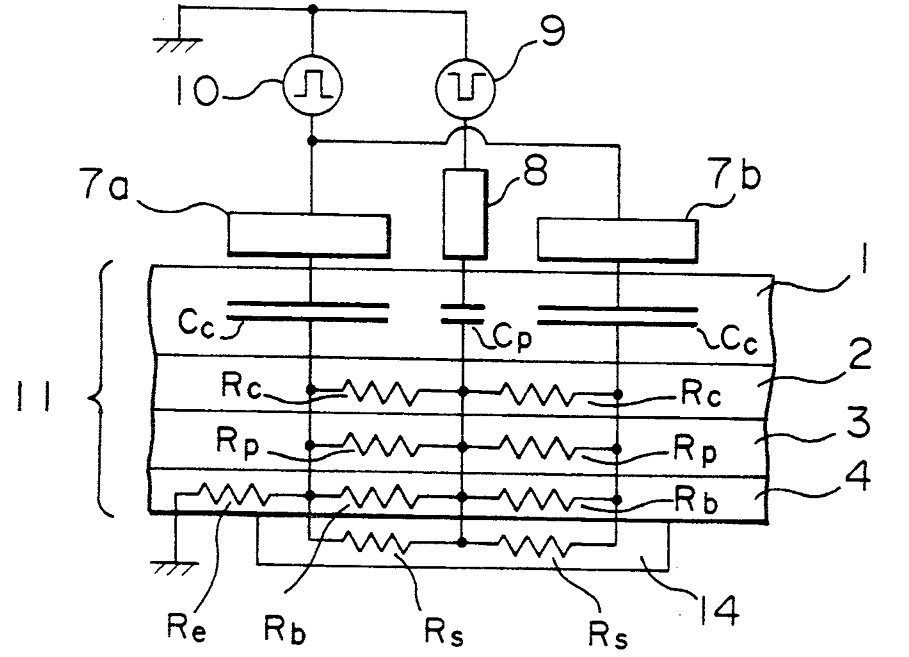

FIG. 1 is a schematic sectional view of a uniplane control type electrostatic latent image forming apparatus according to a first embodiment of the present invention, and FIG. 2 is an electric equivalent circuit diagram thereof. In FIGS. 1 and 2, the same reference numerals as those in FIGS. 6 and 7 are used to denote the same or corresponding parts so that explanation thereof will be omitted.

In FIG. 1, reference numeral 18 denotes a pad roller used for pressing an electrostatic recording paper 11 against a stylus 8 and control electrodes *7a* and *7b*, which pad roller is formed by bonding on the surface of a roller member 13 made of an insulating material such as polyurethane foam a conductive rubber member 14 having a surface resistivity of about $10^5\ \Omega$ to $10^7\ \Omega$ as a conductive member introduced by the present invention. The conductive rubber member 14 is brought into pressure contact at constant pressure with a portion of the back surface of the electrostatic recording paper 11, which portion is opposed to the stylus 8 and the control electrodes *7a* and *7b*, as shown in FIG. 1. Further, the conductive rubber member 14 is kept from coming in direct contact with other conductive members.

Figure 6:
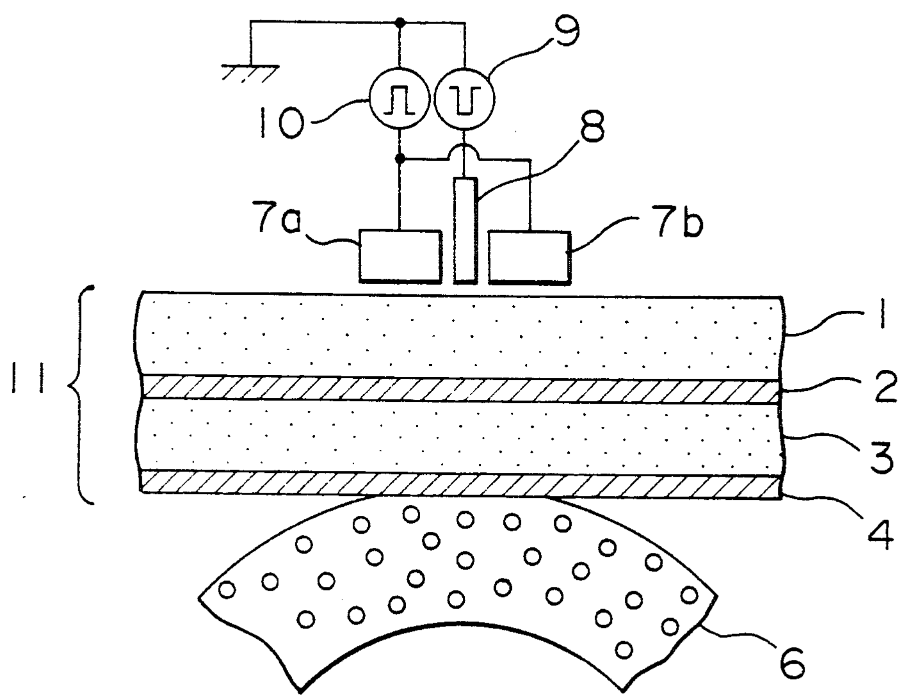
FIGS. 6 and 7 are a schematic sectional view and an electric equivalent circuit diagram of a conventional electrostatic latent image forming apparatus, respectively.
Figure 7:
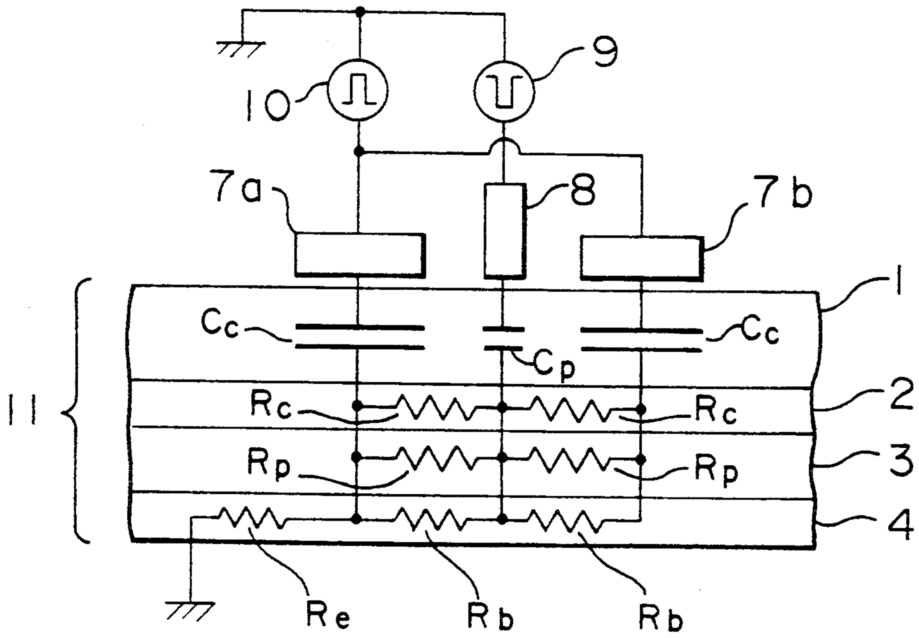

Other arrangements than that described above are identical with those of the conventional apparatus shown in FIG. 6.

It is noted that the surface resistivity of the conductive rubber member 14 can be measured by means of, for example, "High Resistance Meter 4329A" and "Resistivity Cell 16008A" which are manufactured by YOKOGAWA Hewlett-Packard Co., Ltd.

Next, description will be given of the process of forming an electrostatic latent image and the function of the conductive rubber member 14 in the electrostatic latent image forming apparatus according to this embodiment with reference to the equivalent circuit diagram shown in FIG. 2.

The stylus drive circuit 9 and the control electrode drive circuit 10 act to apply simultaneously a recording voltage pulse of a negative polarity and a recording voltage pulse of a positive polarity respectively to the stylus 8 and the control electrodes *7a* and *7b* which are opposed to the electrostatic recording paper 11 with a proper discharge gap kept therebetween.

The recording voltage pulse of a positive polarity applied to the control electrodes *7a* and *7b* raises electric potentials of the intermediate conductive layer 2, the paper base 3, the back resistance layer 4 and the conductive rubber member 14 at positions thereof located directly below the control electrodes *7a* and *7b* placed in capacitive coupling by an electrostatic capacitance Cc possessed by the dielectric layer 1. This rise in the potential is transferred to a position of each layer directly below the stylus 8 by resistivities Rc, Rp, Rb and Rs of the intermediate conductive layer 2, the paper base 3, the back resistance layer 4 and the conductive rubber member 14, respectively, and then appears on the surface of the dielectric layer 1 at a position directly below the stylus 8 through an electrostatic capacitance Cp. In consequence, the difference in potential between the stylus 8 and the dielectric layer 1 at the position directly below the stylus 8 becomes large sufficiently, so that discharge is caused to take place. Then, negative charge is transferred from the stylus 8 to the dielectric layer 1 and stored in the latter, thereby forming an electrostatic latent image.

In this case, since Rc, Rp, Rb and Rs are connected in parallel to one another, the resistance value between points directly below the stylus 8 and the control electrode *7a*, *7b* is determined mainly by the smallest resistance value among the above four resistivities. Namely, if the surface resistivity Rs of the conductive rubber member 14 is set at a value smaller than Rc, Rp and Rb, the resistance value between the points directly below the stylus 8 and the control electrodes *7a*, *7b* is mainly dominated by Rs and prevented from exceeding the value of Rs (Rc and Rb at normal temperature and humidity are generally set at about $10^7\ \Omega$).

Therefore, if the value of Rs is set at a proper value smaller than Rc, Rp and Rb, it is possible to maintain the condition that discharge takes place stably between the stylus 8 and the electrostatic recording paper 11 because, even at high or low humidity which causes Rc, Rp and Rb to decrease or increase, a change in the resistance value between the points directly below the stylus 8 and the control electrodes *7a*, *7b* can be minimized. It is therefore possible to stably form an electrostatic latent image without being affected by the ambient humidity.

Figure 3:
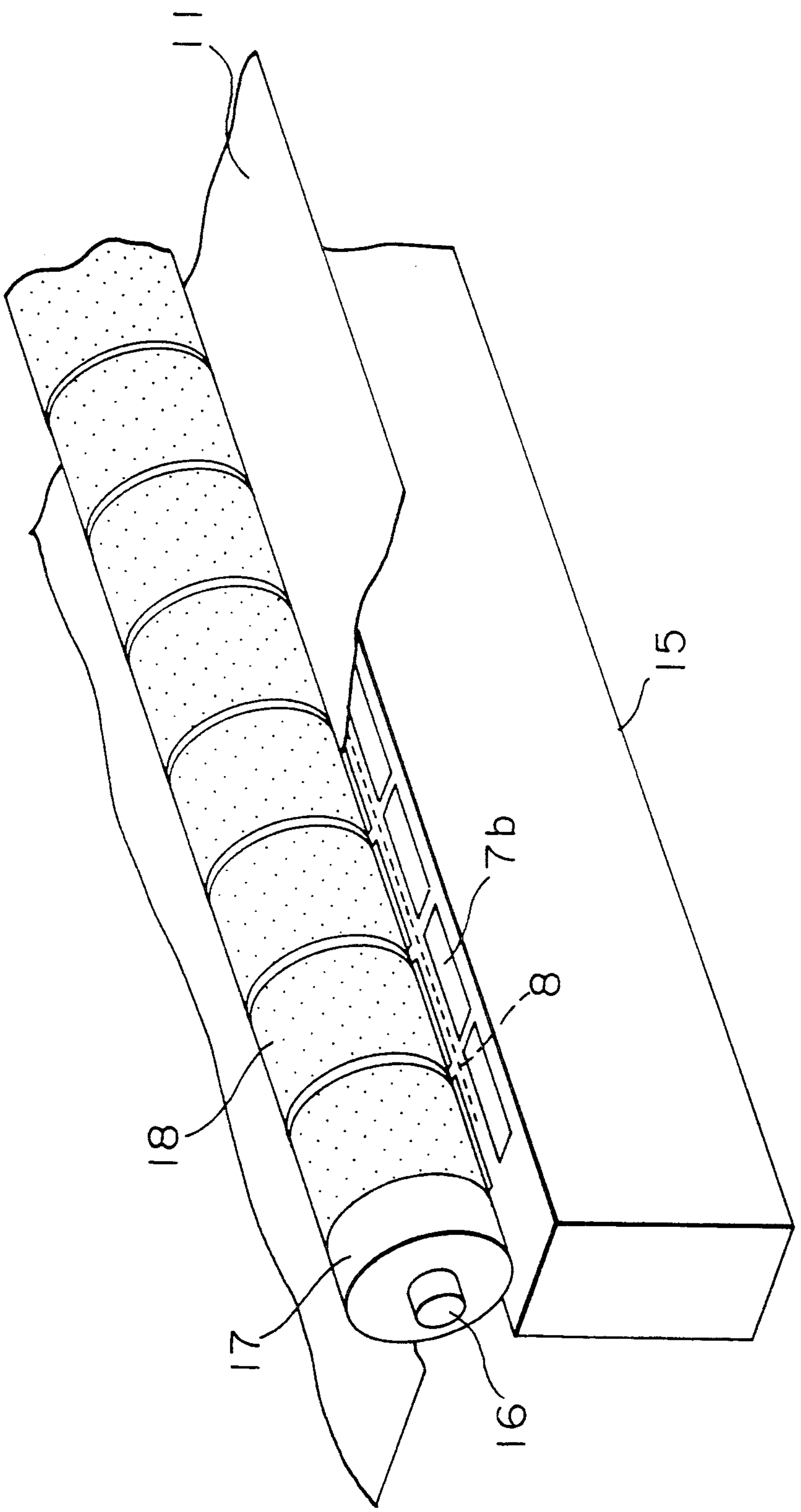

FIG. 3 is a schematic perspective view of a more practical uniplane control type electrostatic latent image forming apparatus according to a second embodiment of the present invention. In FIG. 3, reference numeral 15 denotes a multistylus electrostatic recording head, in which styluses 8 are arranged in a line at constant intervals in its face opposite to the electrostatic recording paper 11 with the control electrodes 7*a* and 7*b* (7*a* being not shown) arranged in two lines in a manner such that styluses 8 are interposed therebetween.

Figure 4:
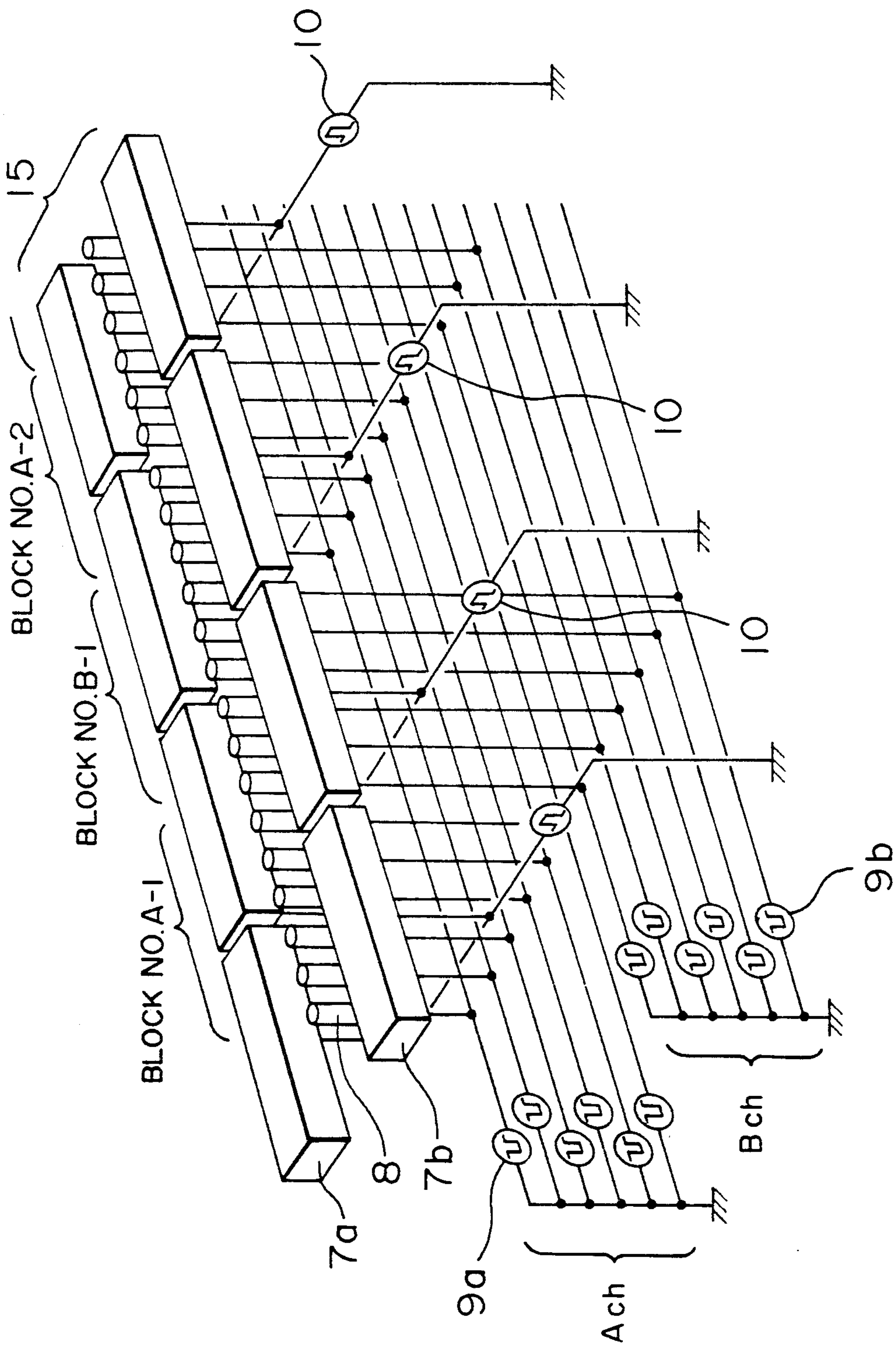

FIG. 4 illustrates the detailed structure of the multistylus electrostatic recording head 14. As shown in this drawing, the styluses 8 are grouped into blocks each including 2 m styluses (m=5 in the case of FIG. 4), and the blocks are classified alternately for A-channel and B-channel. The styluses 8 belonging to the A-channel blocks are connected correspondingly to A-channel stylus drive circuits 9*a* in number m through common signal lines, while the styluses 8 belonging to the B-channel blocks are connected correspondingly to B-channel stylus drive circuits 9*b* in number m through common signal lines.

On the other hand, the control electrodes 7*a*, 7*b* each have a width substantially equal to the width of arrangement of the styluses 8 of one block and are disposed to interpose therebetween half the styluses 8 of two adjacent blocks as shown in the drawing. Each pair of control electrodes 7*a* and 7*b* are connected to the associated control electrode drive circuit 10 through a common signal line.

The electrodes are driven in the following manner. First, the A-channel stylus drive circuits 9*a* are activated to apply a recording voltage pulse of a negative polarity to the styluses 8 belonging to the A-channel blocks and, at the same time, the control electrode drive circuits 10 are activated to apply a recording voltage pulse of a positive polarity to two pairs of control electrodes 7*a* and 7*b* between which the styluses 8 of a first A-channel block (Block No. A-1 shown in FIG. 4) are interposed, thus forming a part of the electrostatic latent image directly below the styluses 8 of Block No. A-1. Subsequently, the B-channel stylus drive circuits 9*b* are activated to apply the recording voltage pulse to the styluses 8 belonging to the B-channel blocks and, at the same time, the recording voltage pulse is applied to two pairs of control electrodes 7*a* and 7*b* between which the styluses 8 of Block No. B-1 are interposed, thus forming another part of the electrostatic latent image directly below the styluses 8 of Block No. B-1. Likewise, the electrostatic latent image part for each block is formed alternately by the A-channel blocks and the B-channel blocks.

Referring now to FIG. 3, reference numeral 16 denotes a pad roller used for pressing the electrostatic recording paper 11 against the styluses 8 and the control electrodes 7*a* and 7*b*, which pad roller is formed by attaching separate conductive members 18 on the surface of a roller member 17 made of an insulating material (such as polyurethane foam). Each of the separate conductive members 18 is made of a material which has a surface resistivity of about 0 Ω and is regarded as a perfect conductor. The conductive members 18 are electrically insulated from one another. Further, it goes without saying that the respective conductive members 18 are prevented from coming in direct contact with other conductive members.

Each of the separate conductive members 18 has a width substantially equal to the width of the control electrodes 7*a*, 7*b* and is located in a manner to be brought into pressure contact with the back surface of the electrostatic recording paper 11 only in an area opposed to an appointed pair of control electrodes 7*a* and 7*b* and the styluses 8 interposed between them.

Figure 5:
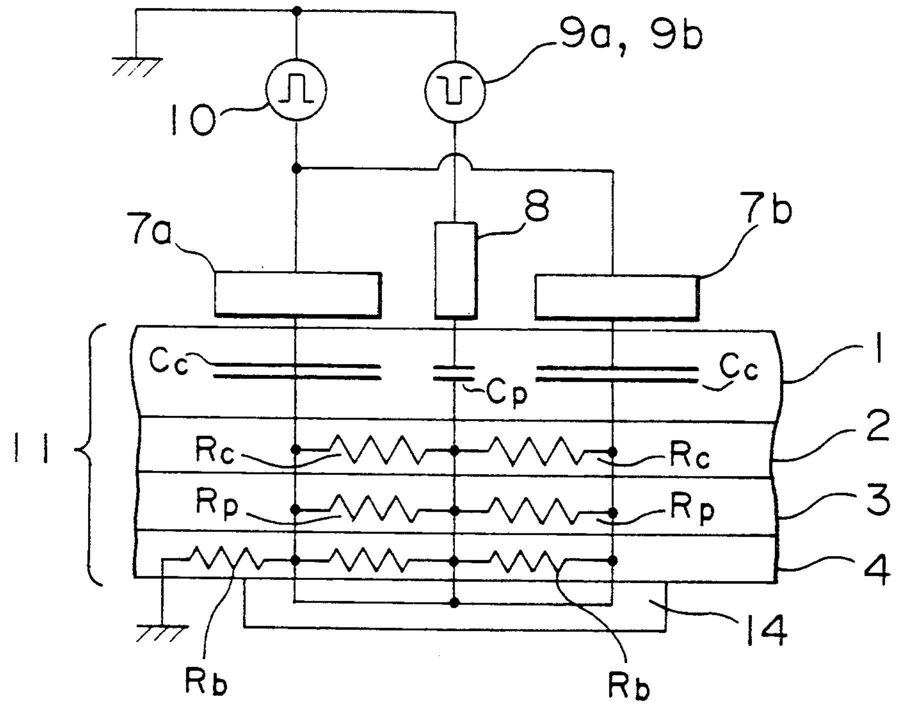

The electric equivalent circuit of the apparatus of this embodiment can be expressed as shown in FIG. 5, because the conductive member 18 is almost a perfect conductor. Namely, the resistance value between the points directly below the stylus 8 and the control electrodes 7*a*, 7*b* is nearly zero and the potentials of the dielectric layer 1 at the positions directly below the stylus 8 and the control electrodes 7*a*, 7*b* are substantially equal to each other.

The electrostatic latent image forming process adopted in this embodiment is the same as that in the aforesaid first embodiment. However, the conductive member 18 is brought into pressure contact to raise the potential at the position directly below the stylus 8 up to a potential substantially equal to the potential at the position directly below the control electrodes 7*a*, 7*b* and therefore, it is possible to allow discharge to take place efficiently between the stylus 8 and the dielectric layer 1. This condition is unchanged even if Rc, Rp and Rb of the electrostatic recording paper 11 are varied in accordance with the change in the ambient humidity. In consequence, it is possible to stably form an electrostatic latent image even at low or high humidity.

Further, since the conductive members 18 are separate, the potentials of only the conductive members 18 corresponding to two pairs of control electrodes to which the positive polarity recording voltage pulse is applied, are raised without substantially raising the potentials of other conductive members 18. Accordingly, there is no possibility of occurrence of a ghost image due to expansion of the potential into the unnecessary portion.

Incidentally, in case the conductive member 18 regarded as a perfect conductor is not separate, the potential of the whole conductive member 18 is raised to allow the ghost image to occur. It is not permissible, therefore, to use a perfect conductor as a material for the conductive member 18, and it is required to use a material having a certain surface resistivity, such as conductive rubber.

In addition, in order to prevent, without fail, the occurrence of the ghost image due to reduction in Rc, Rp and Rb at high humidity, these resistance values may be set at a rather high level.

In the embodiments described above, although the conductive member is mounted on the pad roller so as to be rotated together with electrostatic recording paper, it may be formed as an elastic sheet member, for example. However, in case the conductive member is a stationary member, the coefficient of friction thereof with the electrostatic recording paper should be reduced so as not to apply a load to the electrostatic recording paper during conveyance.

In the aforesaid second embodiment, the separate conductive members can also be made of a material having a certain surface resistivity, such as conductive rubber.

The electrostatic latent image recording medium is not limited to one described in connection with the above embodiments.

Further, in the embodiments described above, it is possible due to the function of the conductive member to form an electrostatic latent image of good quality even if the resistance value of the electrostatic latent image recording medium itself is increased. Therefore, the thickness of the conductive layer, which causes an increase in cost of the electrostatic latent image recording medium, can be made thin (resulting in an increase in the resistance value thereof), thereby making it possible as well to reduce the cost of the electrostatic latent image recording medium.

What is claimed is:

1. An electrostatic latent image forming apparatus comprising:
   a recording head having a set of styluses arranged in a line on a surface thereof facing an electrostatic recording medium, said styluses being electrically connected as stylus blocks each including a predetermined number of styluses, and a set of control electrodes arranged in two lines in a manner to interpose said styluses therebetween;
   first drive means for applying a first voltage of one of polarities to said set of styluses;
   second drive means for selectively applying a second voltage of opposite polarity to said control electrodes in correspondence to said first voltage to allow the potential of said electrostatic recording medium to change in correspondence to said first voltage; and
   a roller disposed on the side of the back surface of said electrostatic recording medium and having a conductive member which is divided into segments of a width substantially equal to the width of said control electrodes and is provided only at portions opposed to said control electrodes and styluses.

2. An electrostatic latent image forming apparatus according to claim 1, wherein the value of the surface resistivity of the conductive member is set to be lower than the smallest resistance value among resistance values possessed by individual members constituting the elctrostatic recording medium.

3. An electrostatic latent image forming apparatus according to claim 2, wherein the conductive member which is brought into pressure contact with the portion opposed to the styluses and control electrodes is made of a conductive rubber material.

4. An electrostatic latent image forming apparatus according to claim 2, wherein the conductive member which is brought into pressure contact with the portion opposed to the styluses and control electrodes is made of a conductive rubber material.

5. An electrostatic latent image forming apparatus comprising:
   a recording head having styluses arranged on a surface thereof facing an electrostatic recording medium, said styluses being electrically connected as stylus blocks each including a predetermined number of styluses, and control electrodes arranged along said styluses;
   first drive means for applying a first voltage of one of polarities to said styluses;
   second drive means for selectively applying a second voltage of opposite polarity to said control electrodes in correspondence to said first voltage to allow the potential of said electrostatic recording medium to change in correspondence to said first voltage; and
   a roller disposed on the side of the back surface of said electrostatic recording medium and having a conductive means which is divided into segments of a width substantially equal to the width of said control electrodes and is provided only at portions opposed to said control electrodes and styluses.

6. An electrostatic latent image forming apparatus according to claim 4, wherein the value of the surface resistivity of the conductive member is set to be lower than the smallest resistance value among resistance values possessed by individual members constituting the electrostatic recording medium.

7. An electrostatic latent image forming apparatus according to claim 6, wherein the conductive member which is brought into pressure contact with the portion opposed to the styluses and control electrodes is made of a conductive rubber material.

8. An electrostatic latent image forming apparatus according to claim 5, wherein the conductive member which is brought into pressure contact with the portion opposed to the styluses and control electrodes is made of a conductive rubber material.

9. An electrostatic latent image forming apparatus comprising:
   a recording head including (a) a plurality of styluses arranged on a surface thereof adapted to face one surface of an electrostatic recording medium and (b) a plurality of control electrodes arranged adjacent said styluses;
   drive means for applying voltage pulses of opposite polarities to said styluses and control electrodes, respectively; and
   means adapted to be disposed on a surface of said electrostatic recording medium opposite to said one surface and having a conductive member which is divided into separate segments having a width substantially equal to a width of said control electrodes, said segments being positioned only at locations opposed to said control electrodes and styluses.

10. A apparatus according to claim 9, wherein said plurality of styluses are arranged in a line on said surface of said recording head.

11. An apparatus according to claim 9, wherein said means having the conductive means comprises a roller adapted to rotate while transferring said electrostatic recording medium.

12. An apparatus according to claim 9, wherein said means having the conductive means comprises an elastic sheet member.

13. An apparatus as in claim 9, wherein said styluses are arranged in a plurality of stylus blocks each including a predetermined number of said styluses electrically connected to one another, and said plurality of control electrodes are arranged in first and second lines with said styluses interposed therebetween; and said drive means comprises first drive means for applying a first voltage having a first polarity to said plurality of styluses and a second drive means for selectively applying a second voltage of opposite polarity to said control electrodes in correspondence to said first voltage to allow a potential of said electrostatic recording medium to change in correspondence to said first voltage; and said means having said conductive member comprises a roller disposed on said surface of said electrostatic recording medium opposite to said one surface, said roller having said conductive member disposed thereon.

14. An apparatus as in claim 13 wherein said plurality styluses are arranged in a line on said surface of said recording head.

15. An apparatus according to claim 9, wherein a magnitude of surface resistivity of the conductive member is lower than a smallest resistance magnitude among resistance values possessed by individual members constituting the electrostatic recording medium.

* * * * *